(12) United States Patent
Yahalom et al.

(10) Patent No.: US 8,332,860 B1
(45) Date of Patent: Dec. 11, 2012

(54) SYSTEMS AND METHODS FOR PATH-BASED TIER-AWARE DYNAMIC CAPACITY MANAGEMENT IN STORAGE NETWORK ENVIRONMENTS

(75) Inventors: Raphael Yahalom, Needham, MA (US); Assaf Levy, Brookline, MA (US)

(73) Assignee: NetApp, Inc., Sunnyvale, CA (US)

( * ) Notice: Subject to any disclaimer, the term of this patent is extended or adjusted under 35 U.S.C. 154(b) by 1290 days.

(21) Appl. No.: 12/006,125

(22) Filed: Dec. 31, 2007

Related U.S. Application Data

(60) Provisional application No. 60/877,948, filed on Dec. 30, 2006.

(51) Int. Cl.
    *G06F 9/46* (2006.01)
(52) U.S. Cl. .................................. 718/104; 709/226
(58) Field of Classification Search .............. 718/104; 709/226
    See application file for complete search history.

(56) References Cited

U.S. PATENT DOCUMENTS

| | | |
|---|---|---|
| 5,043,866 A | 8/1991 | Myre, Jr. et al. |
| 5,280,611 A | 1/1994 | Mohan et al. |
| 5,327,556 A | 7/1994 | Mohan et al. |
| 5,381,545 A | 1/1995 | Baker et al. |
| 5,586,250 A * | 12/1996 | Carbonneau et al. ........ 714/44 |
| 5,684,967 A | 11/1997 | McKenna et al. |
| 5,774,377 A | 6/1998 | Eidson et al. |
| 5,825,772 A | 10/1998 | Dobbins et al. |
| 5,940,819 A | 8/1999 | Beavin et al. |
| 6,014,673 A | 1/2000 | Davis et al. |
| 6,223,176 B1 | 4/2001 | Ricard et al. |
| 6,233,240 B1 | 5/2001 | Barbas et al. |
| 6,240,463 B1 | 5/2001 | Benmohamed et al. |
| 6,327,598 B1 | 12/2001 | Kelley et al. |
| 6,347,335 B1 | 2/2002 | Shagam et al. |
| 6,434,626 B1 | 8/2002 | Prakash et al. |
| 6,636,981 B1 | 10/2003 | Barnett et al. |
| 6,691,169 B1 | 2/2004 | D'Souza |
| 6,751,228 B1 | 6/2004 | Okamura |
| 6,792,503 B2 | 9/2004 | Yagi et al. |
| 6,795,399 B1 | 9/2004 | Benmohamed et al. |
| 6,801,949 B1 | 10/2004 | Bruck et al. |

(Continued)

FOREIGN PATENT DOCUMENTS

WO  WO-01/82077  11/2001

(Continued)

OTHER PUBLICATIONS

"Storage Management and the Continued Importance of CIM," White Paper, Data Mobility Group (Jan. 2004).

(Continued)

*Primary Examiner* — Meng An
*Assistant Examiner* — Abu Z Ghaffari
(74) *Attorney, Agent, or Firm* — Ropes & Gray LLP

(57) ABSTRACT

A dynamic approach for managing capacity in a storage environments accounting for various resource types, tiers, access paths, relationships among different storage environment components, as well as managing capacity in terms of resource planning and consumption is provided. Resource planning and consumption processes are used to allocate and reserve resources of different types and different tiers to each access path in the network. Capacity information for different resources types and tiers is automatically aggregated from different network components at different stages of a resource management cycle. The aggregated information may be used to estimate future resource needs or determine deviations between projected and actual status from which adjustments may be made to better predict future capacity needs.

19 Claims, 12 Drawing Sheets

U.S. PATENT DOCUMENTS

| | | | |
|---|---|---|---|
| 6,816,927 | B2 | 11/2004 | Bouchet |
| 6,904,143 | B1 | 6/2005 | Peterson et al. |
| 6,909,700 | B1 | 6/2005 | Benmohamed et al. |
| 7,051,029 | B1 | 5/2006 | Fayyad et al. |
| 7,058,702 | B2 | 6/2006 | Hogan |
| 7,062,559 | B2 | 6/2006 | Yoshimura et al. |
| 7,069,480 | B1 | 6/2006 | Lovy et al. |
| 7,103,653 | B2 | 9/2006 | Iwatani |
| 7,103,712 | B2 | 9/2006 | Mizuno et al. |
| 7,120,654 | B2 | 10/2006 | Bromley |
| 7,127,633 | B1 | 10/2006 | Olson et al. |
| 7,149,886 | B2 | 12/2006 | Fujibayashi et al. |
| 7,194,538 | B1 | 3/2007 | Rabe et al. |
| 7,260,628 | B2 | 8/2007 | Yamamoto et al. |
| 7,376,937 | B1 | 5/2008 | Srivastava et al. |
| 7,380,239 | B1 | 5/2008 | Srivastava et al. |
| 7,512,954 | B2 | 3/2009 | Srivastava et al. |
| 7,546,333 | B2 | 6/2009 | Alon et al. |
| 7,617,320 | B2 | 11/2009 | Alon et al. |
| 2001/0047482 | A1* | 11/2001 | Harris et al. .............. 713/200 |
| 2002/0145981 | A1 | 10/2002 | Klinker et al. |
| 2003/0005119 | A1 | 1/2003 | Mercier et al. |
| 2003/0018619 | A1 | 1/2003 | Bae et al. |
| 2003/0033346 | A1* | 2/2003 | Carlson et al. ............. 709/104 |
| 2003/0033398 | A1* | 2/2003 | Carlson et al. ............. 709/223 |
| 2003/0055932 | A1 | 3/2003 | Brisse |
| 2003/0131077 | A1 | 7/2003 | Hogan |
| 2003/0191992 | A1 | 10/2003 | Kaminsky et al. |
| 2003/0208589 | A1 | 11/2003 | Yamamoto |
| 2003/0237017 | A1 | 12/2003 | Jibbe |
| 2004/0030768 | A1 | 2/2004 | Krishnamoorthy et al. |
| 2004/0075680 | A1 | 4/2004 | Grace et al. |
| 2004/0093607 | A1 | 5/2004 | Elliott |
| 2004/0119833 | A1 | 6/2004 | Duncan et al. |
| 2004/0205089 | A1* | 10/2004 | Alon et al. .................... 707/200 |
| 2004/0215749 | A1 | 10/2004 | Tsao |
| 2004/0243699 | A1 | 12/2004 | Koclanes et al. |
| 2005/0010682 | A1 | 1/2005 | Amir et al. |
| 2005/0014403 | A1 | 1/2005 | Joist |
| 2005/0033757 | A1* | 2/2005 | Greenblatt et al. ........... 707/100 |
| 2005/0044088 | A1 | 2/2005 | Lindsay et al. |
| 2005/0097471 | A1 | 5/2005 | Faraday et al. |
| 2005/0160431 | A1 | 7/2005 | Srivastava et al. |
| 2005/0256961 | A1* | 11/2005 | Alon et al. .................... 709/229 |
| 2005/0262233 | A1* | 11/2005 | Alon et al. .................... 709/223 |
| 2006/0004830 | A1 | 1/2006 | Lora et al. |
| 2006/0106938 | A1 | 5/2006 | Dini et al. |
| 2006/0143492 | A1 | 6/2006 | LeDuc et al. |
| 2006/0161883 | A1 | 7/2006 | Lubrecht et al. |
| 2006/0161884 | A1 | 7/2006 | Lubrecht et al. |
| 2006/0218366 | A1 | 9/2006 | Fukuda |
| 2007/0088763 | A1 | 4/2007 | Yahalom et al. |
| 2007/0094378 | A1 | 4/2007 | Baldwin et al. |
| 2007/0112883 | A1 | 5/2007 | Asano et al. |
| 2007/0169177 | A1 | 7/2007 | MacKenzie et al. |
| 2007/0179985 | A1 | 8/2007 | Knowles et al. |
| 2007/0198722 | A1 | 8/2007 | Kottomtharayil et al. |
| 2007/0208920 | A1 | 9/2007 | Tevis |
| 2008/0155208 | A1 | 6/2008 | Hiltgen et al. |
| 2008/0155223 | A1 | 6/2008 | Hiltgen et al. |
| 2008/0189468 | A1 | 8/2008 | Schmidt et al. |
| 2008/0189700 | A1 | 8/2008 | Schmidt et al. |
| 2009/0172666 | A1 | 7/2009 | Yahalom et al. |
| 2009/0313367 | A1 | 12/2009 | Alon et al. |

FOREIGN PATENT DOCUMENTS

| | | |
|---|---|---|
| WO | WO-02/088947 | 11/2002 |
| WO | WO-03/054711 | 7/2003 |
| WO | WO-2004/111765 | 12/2004 |

OTHER PUBLICATIONS

"Softek SANView: Simplify the discovery and management of multi-vendor SANs," Fujitsu Softek (May 2002).

"Information Lifecycle Management: An Automated Approach," Technical White Paper, EMC2 (Dec. 8, 2003).

"Kasten Chase Unveils Advanced Security Architecture," GRIDtoday, v.1, n. 18; www.gridtoday.com/02/101/100546.html, (Oct. 14, 2002), printed from Internet on Oct. 16, 2003.

"Assurency: Comprehensive, Persistent Security for Storage Area Networks," Kasten Chase (2002).

"Radiant Data Server Technology Overview," White Paper, Radiant Data Corporation (2003).

Lee et al., "Storage Network Management Software—The Critical Enabler of Maximum ROI," Storage Consulting Group (Dec. 16, 2002).

U.S. Appl. No. 11/965,392, filed Dec. 27, 2007.
U.S. Appl. No. 12/080,946, filed Apr. 7, 2008.
U.S. Appl. No. 12/283,163, filed Sep. 9, 2008.

\* cited by examiner

Edit Service Request

Enter the details of the service request

| Name: | ERP | | Owner: | admin |
| --- | --- | --- | --- | --- |
| Requester: | JLR | | E-mail: | jlr@monarasaf.com |
| Data Center: | Inverness | | SAN: | Building |
| Business Unit: | PM | | Project: | |
| Creation Date: | 7/23/07 6:07 PM | | Due Date: | 7/23/07 6:07 PM |
| Ticket: | | | | |

Targets | Requirements | Reservations | Notes

| Description | Estimated Cost | Actual Cost | Satisfied | Completed |
| --- | --- | --- | --- | --- |
| ERP | 19800 | 7200 | | |
| 3 LUNS of 60 GB each from Tier Gold | 18000 | 6400 | ⊘ | |
| 120 GB of raw capacity on storage ... | | 800 | | |
| 120 GB of raw capacity on storage ... | | 800 | | |
| 120 GB of raw capacity on storage ... | | 800 | | |
| 2 LUNS of 10 GB each from Tier Silver | 1000 | 800 | ⊘ | |
| Volume 0006 on storage Sym-0050 ... | | 800 | | |
| Volume 0010 on storage Sym-0050 ... | | 800 | | |
| Volume 0005 on storage Sym-0050 ... | | | | |
| Volume 0008 on storage Sym-0050 ... | | | | |
| Volume 0009 on storage Sym-0050 ... | | | | |
| Volume 0007 on storage Sym-0050 ... | | | | |
| Volume 0000 on storage Sym-0050 ... | | | | |
| Volume 0011 on storage Sym-0050 ... | | | | |
| 4 switch ports | 800 | 200 | ⊘ | |
| Port fc9 on switch F0brcd-a | | 200 | | |
| Port fc6 on switch F0brcd-a | | | | |

Total Estimated Cost: 19,800    Total Actual Cost: 7,200

Satisfied Requirements: 3/3    Completed Reservations: 0/15

FIG. 6

Chargeback Summary

| Tier | Cost (1GB) |
|---|---|
| 2-Silver | $10 |
| 3-Bronze | $8 |
| 1-Gold | $15 |

| Business Unit | 2-Silver | | 3-Bronze | | 1-Gold | | Total | |
|---|---|---|---|---|---|---|---|---|
| | Capacity | Cost | Capacity | Cost | Capacity | Cost | Capacity | Cost |
| Dev | 0 | $0 | 8 | $64 | 32 | $480 | 40 | $544 |
| Customer suport | 0 | $0 | 16 | $128 | 0 | $0 | 16 | $129 |
| Trading | 112 | $1,120 | 0 | $0 | 0 | $0 | 112 | $1,120 |
| Stores | 64 | $640 | 0 | $0 | 0 | $0 | 64 | $640 |
| Marketing | 184 | $1,840 | 0 | $0 | 0 | $0 | 184 | $1,840 |
| Legal | 112 | $1,120 | 0 | $0 | 0 | $0 | 112 | $1,120 |
| Total | 472 | $4,720 | 24 | $192 | 32 | $480 | 528 | $5,393 |

FIG. 7

Chargeback By Business Unit: Marketing

| Tier | Cost (1GB) |
|---|---|
| 2-Silver | $11 |
| 3-Bronze | $8 |
| 1-Gold | $16 |

| Date | 2-Silver | | | 3-Bronze | | | 1-Gold | | | Total | | |
|---|---|---|---|---|---|---|---|---|---|---|---|---|
| | Capacity | Cost | Capacity Diff | Capacity | Cost | Capacity Diff | Cost Diff | Capacity | Cost | Capacity Diff | Cost Diff | |
| | Capacity | Cost | Capacity Diff | Capacity | Cost | Capacity Diff | Cost Diff | Capacity | Cost | Capacity Diff | Cost | Capacity Diff | Cost Diff |

| Date | Capacity | Cost | Capacity Diff | Cost Diff | Capacity | Cost | Capacity Diff | Cost Diff | Capacity | Cost | Capacity Diff | Cost Diff | Capacity | Cost | Capacity Diff | Cost Diff |
|---|---|---|---|---|---|---|---|---|---|---|---|---|---|---|---|---|
| 2006-09-01 | 0 | $0 | 0 | $0 | 0 | $0 | 0 | $0 | 0 | $0 | 0 | $0 | 0 | $0 | 0 | $0 |
| 2006-10-01 | 0 | $0 | 0 | $0 | 0 | $0 | 0 | $0 | 0 | $0 | 0 | $0 | 0 | $0 | 0 | $0 |
| 2006-11-01 | 0 | $0 | 0 | $0 | 0 | $0 | 0 | $0 | 0 | $0 | 0 | $0 | 0 | $0 | 0 | $0 |
| 2006-12-01 | 0 | $0 | 0 | $0 | 0 | $0 | 0 | $0 | 0 | $0 | 0 | $0 | 0 | $0 | 0 | $0 |
| 2007-01-01 | 0 | $0 | 0 | $0 | 0 | $0 | 0 | $0 | 0 | $0 | 0 | $0 | 0 | $0 | 0 | $0 |
| 2007-02-01 | 0 | $0 | 0 | $0 | 0 | $0 | 0 | $0 | 0 | $0 | 0 | $0 | 0 | $0 | 0 | $0 |
| 2007-03-01 | 0 | $0 | 0 | $0 | 0 | $0 | 0 | $0 | 0 | $0 | 0 | $0 | 0 | $0 | 0 | $0 |
| 2007-04-01 | 184 | $2,024 | 184 | $2,024 | 0 | $0 | 0 | $0 | 0 | $0 | 0 | $0 | 184 | $2,024 | 184 | $2,024 |
| 2007-05-01 | 184 | $2,024 | 0 | $0 | 0 | $0 | 0 | $0 | 0 | $0 | 0 | $0 | 184 | $2,024 | 0 | $0 |
| 2007-06-01 | 184 | $2,024 | 0 | $0 | 0 | $0 | 0 | $0 | 0 | $0 | 0 | $0 | 184 | $2,024 | 0 | $0 |
| 2007-07-01 | 184 | $2,024 | 0 | $0 | 0 | $0 | 0 | $0 | 0 | $0 | 0 | $0 | 184 | $2,024 | 0 | $0 |
| 2007-08-01 | 184 | $2,024 | 0 | $0 | 0 | $0 | 0 | $0 | 0 | $0 | 0 | $0 | 184 | $2,024 | 0 | $0 |
| Total | 920 | $10,120 | 184 | $2,024 | 0 | $0 | 0 | $0 | 0 | $0 | 0 | $0 | 920 | $10,120 | 184 | $2,024 |

FIG. 8

SYSTEMS AND METHODS FOR PATH-BASED TIER-AWARE DYNAMIC CAPACITY MANAGEMENT IN STORAGE NETWORK ENVIRONMENTS

CROSS-REFERENCE TO RELATED PATENT APPLICATIONS

This application claims the benefit under 35 U.S.C. §119 (e) of U.S. Provisional Application No. 60/877,948 filed Dec. 30, 2006, which is hereby incorporated herein by reference in its entirety.

FIELD OF THE INVENTION

The systems and methods generally relate to the field of capacity management in storage environments.

BACKGROUND

There is a significant need to tie in a meaningful way the level of storage service provided to applications by storage environments, to the amount of resources required to provide that level of service. There is a need also to consider the quality levels of the individual components and the joint attributes along data flow paths, thereby allowing for better service levels as well as resource consumption. An exemplary storage infrastructure environment is a SAN that enables multiple applications on hosts to access data stored in one or more consolidated/shared storage infrastructures. Storage area networks (SANs) or storage network environments are dedicated networks for enabling multiple applications on hosts access to data stored in consolidated shared storage infrastructures. Enterprises are deploying increasingly large-scale SANs in order to gain economies-of-scale business benefits, and are performing and planning massive business-critical migration processes to these new environments.

Enterprise SANs are increasingly supporting most of the business critical applications in enterprises. These SAN are increasingly large and complex. A typical SAN environment in a Fortune 500 company may contain hundreds or thousands of servers and tens or hundreds of switches and storage devices of different types. Furthermore these SAN environments are undergoing a large amount of change and growth.

This large size and rate of growth of SANs leads to huge added complexity. The number of components and links which may be associated with the data transfer from each given application and one or more of its data units may increase exponentially with the size of the SAN. This complexity, which is compounded by the heterogeneity of the different SAN devices, leads to high risk and inefficiency. Changes to the SAN (which need to happen often due to the natural growth of the SAN) take a long time to complete by groups of SAN managers, and are error-prone. For example, in many existing enterprises a routine change (such as adding a new server to a SAN) may take 1-2 weeks to complete, and a high percentage of these change process (sometime as high as 30-40%) include at least one error along the way. It is estimated that around 80% of enterprise SAN outage events are a result of some infrastructure change-related event.

The end-points in SAN flows generally have a relatively strong exclusive access relationship. That is, each application on a SAN-connected host typically requires access, and often exclusive access, only to some specific SAN data objects (LUNs). Consequently, in storage area networks each source end point, i.e., the application on a host, will typically need to interact only, and often exclusively, with a specific, small number of target end points, e.g., the LUNs on the network storage devices.

However, access relationships and their related access characteristics actually need to be realized by setting up multiple underlying devices of different types. These underlying operations include multiple physical and logical basic set up actions which need to be set up in different locations and device types and with mutual consistency.

An access path or a logical access path will encompass a logical channel between a given application and a given data object, e.g. LUN, along which data may flow. In other words, a logical access path is typically, although not exclusively, a sequence of components starting with a specific application on a specific server via, for example, an HBA, and a sequence of one or more switches and physical links leading to a storage controller and a storage device containing a data object e.g. a LUN. The logical or configuration state of each component along the way in that sequence, for example, the HBA, the storage controller, or the switches, is set such as to not disable data flow between that specific application and that specific data object along that specific sequence.

In a storage infrastructure, frequent mismatches occur between actual capacity needs and projected capacity requirement. This may be because typical capacity management approaches are too resource-specific or point-in-time oriented. Hence, these approaches cannot consider, in a time-consistent and application end-to-end fashion, the actual status of resource consumption or reservation in a data network. These approaches also cannot account for the complete relationship among network applications, storage service levels, and resource capacity. Changes within a storage network environment are also difficult to detect. For instance, a failure of a storage area network switch may eliminate an access path between two components on the network thereby disrupting the corresponding storage availability.

Because of the potentially very large number of components in the storage network environment, very frequent storage network environment changes, and large amount of local state information of each component, and because of the complexity of performing the correlation of the information and analysis of the end-to-end access paths and attributes, any capacity management approach needs to be very efficient to perform the task of managing storage capacity in SANs effectively in realistic environments.

Currently, there are no adequate technological solutions to assist SAN administrators in managing storage capacity in storage environment. There are no solutions which considers the end to end service levels of applications, the end to end access paths for data flow, and the tier levels of resources and combination of resources. As such, there exists a need for systems and methods capable of providing dynamic management of resources in a data network. Consequently, a company's spending on resources may not closely align with its expected return on such investment. In particular, there is a need for a solution to the problem of efficiently managing the storage capacity in components in storage area network environments and mapping these changes to access paths and storage service levels for applications and/or hosts.

SUMMARY

The systems and methods described herein include, among other things, processes for periodically analyzing the capacity level of resources associated with applications in a storage network environment. In one practice, these processes collect information from sources in the network environment, correlate the collected information, and derive access paths in the network environment.

In certain practice, the process derives tier levels of network components and resources. Optionally, the process may derive the tier levels of a resource or a component by setting tier assignment rules, deriving a type, an attribute value, and an annotation value of the component or the resource, and using rules to determine a tier level of the corresponding component based on the type, the attribute value and the annotation value. In some embodiments, the tier level of a component or a resource is a ranking of normalized value ranges associated with storage service levels.

The process may compute for each access path the total amount of allocated resources and the corresponding tier levels. In certain practice, these access paths may be computed by mapping network component configuration and connectivity information to nodes and vertices of an abstract graph and determining whether information can flow between end nodes in the graph.

In certain embodiments, the process may collect from a reservation repository information about all the resources and tier levels reserved for each host application. In certain practice, the process may accumulate for each application the total amount of allocated and reserved resources and tier levels allocated to the application and classifying the allocated and reserved resources into tiers into allocated and reserved resources on access paths and allocated and reserved resources not on access paths.

In certain practice, the reservation repository may contain information about the allocated and reserved resources in the network environment at a current time. In certain practice, the process continuously monitors the network environment and the reservation repository. Optionally, state change events may be detected and updated state information obtained. In certain practice, the updated state information may be used to compute, for each application, the accumulated total amount of allocated and reserved resources and tier levels allocated to the application. In some embodiments, the updated state information may be used to analyze the allocated and reserved resources allocated to or reserved for each application and determine whether the allocated and reserved resources are currently accessible by the application via an access path.

In certain aspects, the process may periodically generate summary reports containing current levels of allocated or reserved resources and the total amounts of allocated and reserved resources. In some embodiments, a ratio of the total amount of allocated and reserved resources to an amount of total available resources in the corresponding component, or to an amount of allocated and reserved resources at other components of the same type and tier, is computed. In certain practice, the summary report may contain a cost of the allocated or reserved resources. In certain embodiments, the process may provide information in the summary reports on component power-consumption, component heat generation, and component physical space consumption.

In another aspect, the process responds to a state change request in a storage network environment. In certain embodiments, the process selects resources for satisfying a request, plans the allocation of resources, reserves resources of a selected type and a selected tier level; allocates each reserved resource, makes additional resources available, validates the request has been satisfied, and notifies designated users of the validation. In some embodiments, the process may make additional resources available by informing the reservation repository that the resources are available and updating the state of the corresponding environment component to disassociate the resources from any network application.

In certain practice, the process may reserve a resource by checking that the resource is not already reserved, checking that the resource is not already allocated, and informing the reservation repository about the resource and reservation attributes. The reservation attributes may include an associated application, a reservation timestamp, a reservation user, and constraints associated with converting a reserved resource to an allocated resource. Optionally, the process may allocate each reserved resources by checking that resource is not already reserved by another application, checking that the resource is not already allocated, informing the reservation repository about the resource and allocation attributes, and updating the state of a corresponding environment component to associate a reserved resource with a corresponding application. The allocation attributes may include an associated application, an allocation timestamp, and an allocation user.

In another aspect, there are set out herein systems for managing the capacity of resources associated with applications in a storage network environment. In certain embodiments, such systems comprise a capacity manager which collects information from sources in the network environment, correlates the information, and derives access paths in the network environment.

In certain practice, the capacity manager may derive tier levels of network components and resources, compute, for each access path, the total amount of allocated and reserved resources and the corresponding tier levels, and collect, from a reservation repository, information about all the resources and tier levels reserved for each host application. In some embodiments, the capacity manager accumulates, for each application, the total amount of allocated and reserved resources and tier levels allocated to the application, and classifies allocated and reserved resources into allocated and reserved resources on access paths and allocated and reserved resources not on access paths.

In certain practice, the capacity manager constructs a resource capacity policy repository containing the required attributes of resources of different types and different tiers reserved or allocated for a set of applications, periodically collects information from the storage environment components, the reservation repository, and the capacity policy repository to identify violations of the policy, and sends notification messages to designated recipients with the identified violations.

In some embodiments, violations may include notification messages regarding a resource that is allocated to an application but is not accessible to that application via an access path. Violations may also include resources reserved by an application but not allocated to said application within a pre-selected interval of time and resources allocated to an application but with a type or a tier not consistent with the requirements of the capacity policy repository. In certain embodiments, violations may include having a total amount of resources reserved by an application or allocated to an application inconsistent with the requirements of the capacity policy repository, or having a total amount of resources reserved or allocated to a set of storage environment components not consistent with the requirements of the capacity policy repository.

Optionally, the capacity manager may associate a timestamp with each resource allocation event and each resource reservation event. The capacity manager may associate a timestamp with each resource allocation state and update the timestamp after a new resource allocation event. The capacity manager may associate a timestamp with each resource reservation state and update the timestamp after a new resource reservation event. Optionally, the capacity manager may maintain a list of past and present resource allocation states, resource reservation states, resource allocation events, and resource reservations events. The capacity manager may use this list to provide responses to queries about resource allocation and resource reservation at a given time.

The capacity manager may optionally compute projections of allocation states and reservation states and of resources of specific types and tiers. This computation may involve an extrapolation and trend from past allocation states and past reservation states and may use external input from authorized users. In certain practice, the computed projections may be used to provide responses to queries about resource allocation and resource reservation at a future time.

In some embodiments, the capacity manager may estimate the type, tier, or level of utilization for each component in the storage environment. Optionally, the capacity manager may compute the level of utilization by computing a ratio of the amount of allocated and reserved resources of a storage environment component, resource types, and resource tiers, to the total amount of allocated and reserved resources. In certain practice, the capacity manager may provide violation notifications if the computed ratio is higher or lower than a preselected threshold in the capacity policy repository.

The capacity manager may periodically compute current allocation and reservations of different applications and different resources types and tiers. Optionally, the capacity manager may compare the current allocation and reservation with computed projections and generate a projection violation notification if necessary. The capacity manager may send this violation notification to a designated recipient.

BRIEF DESCRIPTION OF THE DRAWINGS

The above and other aspects and advantages of the embodiments will be apparent upon consideration of the following detailed description, taken in conjunction with the accompanying drawings, in which like reference characters refer to like parts throughout, which may not be drawn to scale, and in which:

FIG. 6 presents an exemplary reservation specification based on a screen in a capacity manager;

FIG. 7 presents an exemplary chargeback or cost summary report generated by a capacity manager;

FIG. 8 presents an exemplary chargeback or cost summary report, with further breakdown by different days, generated by the capacity manager;

DETAILED DESCRIPTION OF ILLUSTRATIVE EMBODIMENTS

The systems and methods, in various embodiments, provide, among other things, processes for dynamic capacity management. Although the invention is described below with reference to a Storage Area Network (SAN), the description does not limit the invention, and the various embodiments set out below and depicted in the figures are merely provided for the purposes of illustrating certain embodiments of these systems and methods and for describing examples of such systems and methods. It will be apparent to those of skill in the art that the systems and methods described herein may, in certain forms, be employed in other types of storage infrastructure environments or any other networks for which access paths are defined and monitored. Thus, the scope of the invention is at least the scope defined by the appended claims and equivalents.

A SAN or storage network environment is a network dedicated to enabling multiple applications on multiple hosts to access, i.e., read and write, data which is stored on multiple shared storage devices. A SAN consists of SAN devices, for example, different types of switches, which are interlinked, and is based on a number of possible transfer protocols such as Fiber Channel and iSCSI. Each server is connected to a SAN with one or more network cards, for example, an HBA. Application data is stored as data objects on storage devices in storage units e.g. LUNs. The storage devices may be used to store data related to the applications on the host.

Thus, a storage network environment may comprise various types of components such as interconnected network components and storage device components. The storage environment may also comprise storage environment components for storing data objects (such as storage devices of different types) and for enabling read and wrote access to stored data objects (such as switches and directors of different types and other types of storage networking devices). Such storage network environments enable applications to be executed on hosts and communicate with the storage environment components to gain read and writer access to their data objects.

Figure 1:
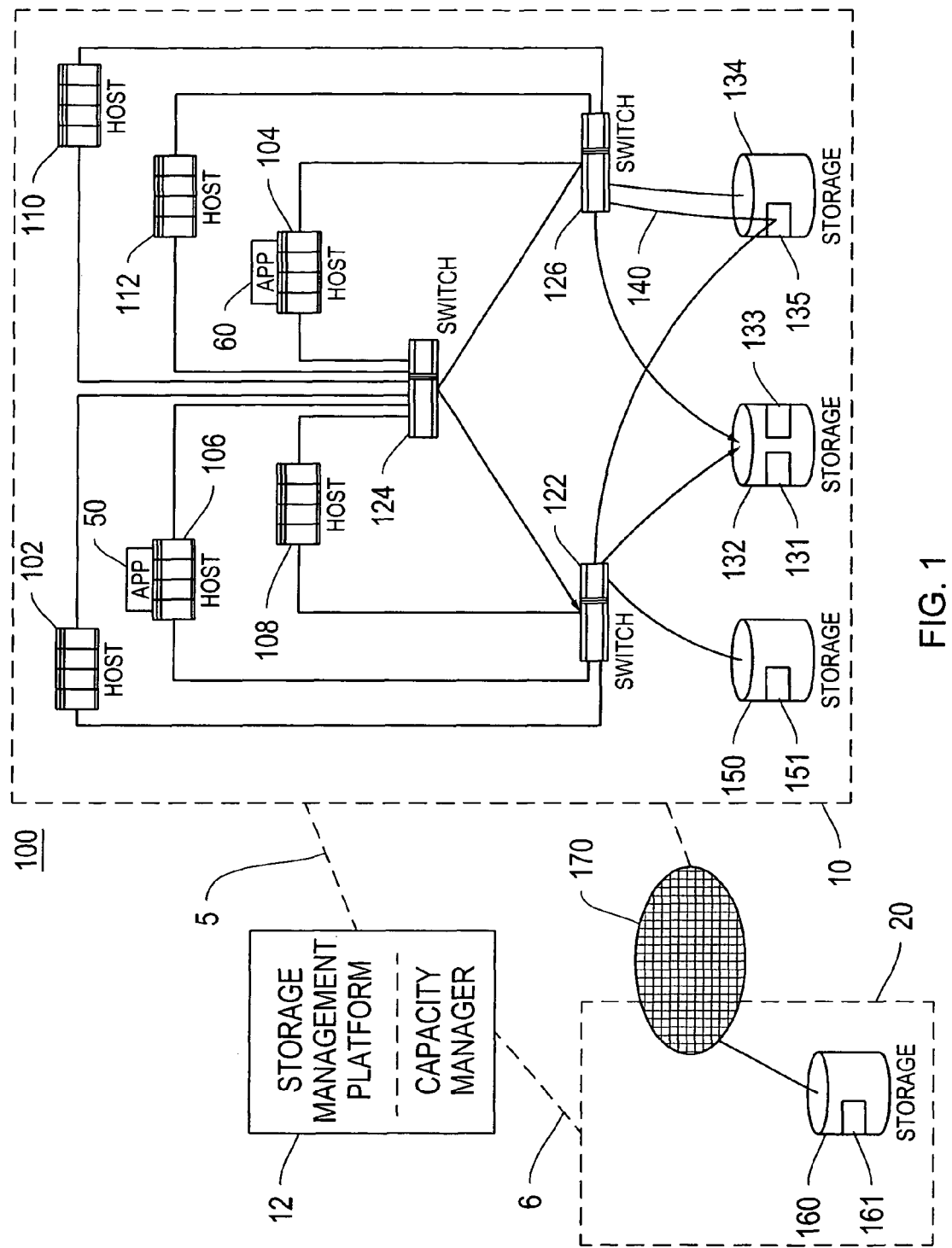
FIG. 1 shows a topological view of an exemplary storage area network infrastructure.

FIG. 1 shows a topological view of an exemplary SAN structure 100. As shown, the environment includes hosts (such as 102, 104, 106, 108, 110 and 112) switches (such as 122, 124 and 126) and data storage devices (such as 132, 134, and 150). The storage devices may be, for example, disk drives, such as RAID devices, tape drives, or other types of mass-storage devices. Storage devices may contains data objects such as volumes (e.g. 131, 133 and 135) which are stored on the storage devices. Applications execute on hosts, for example application 50 on host 106, and require read and write access to certain volumes on storage devices.

FIG. 1 also depicts a Storage Management Platform (SMP) which interacts with the storage infrastructure components and performs analysis and management tasks (12). A Capacity Manager module (14) is one of the internal modules with the SMP.

Each storage environment component has a certain type which defines its category (e.g. disk storage device, tape storage device, etc), its manufacturer (e.g. vendor name, such as EMC, IBM, Netapp, etc), its product name (e.g. Symmetrics, Clarion, Shark, etc)., and its model (e.g. its version, add-ons, etc).

Each storage network environment component has an internal state. The internal state of each storage network environment component at each point of time contains values for various execution state variables (such as for example amount of data that flowed through a certain port in a recent interval, or the data stored at a particular location) as well as configuration state variables (such as which ports are enabled, which other component is connected via each ports, what are the set transfer rates, which zones are defined, which are the members of each zone, etc). Changes to execution state variables occur as a result of data flow related activities, whereas changes to the configuration state variables occur as a result of planned or unplanned configuration actions.

Each storage environment component may have multiple attributes associated with it, and characterizing various aspects of the functionality of that component. For example the attributes of a switch may include among others the maximum number of ports, the maximum data transfer rates, etc. For example the attributes of a storage device component may include among others the maximum capacity, the maximum rate of data reads or writes, the RAID level, etc. The value of some of these attributes can be obtained by querying the component directly, whereas the value of other values can be deduced from the component type (that is from the information about manufacturer, product, model, etc.).

Based on its attribute values, each storage environment component can be classified to a Tier level. The Tier level of a storage environment component represents rank classification, relative to other components of the same type and category, of the level of storage service it can support in key storage service dimensions (such as availability and performance).

For example a high performance storage device such as an EMC DMX with appropriate RAID set-up can be classified as a Tier 1 component due to its superior data read/write rates attribute characteristics (performance dimension), and its internal redundancy characteristics (availability dimension), relative for example to mid-range storage devices such as EMC Clarion which has lower performance and availability characteristics and can be classified to a lower Tier (such as Tier 2).

Each storage environment component contains a certain amount of resources, each such resource can be allocated for an exclusive use by a single entity (such as a single application on a host) or by a set of entities (such as a number of applications on a number of hosts). The type of resources which are associated with a component depend on the component type. For example resources of storage devices include units of storage capacity, whereas resources of switches include switch ports.

Each resource can also be classified to a Tier level. The Tier level of a resource is determined by the Tier of the component with which it is associated, as well as possibly by additional characteristics specific to that resource. For example the Tier level of a Volume of data stored on a storage device is determined by the Tier level of the corresponding storage device, as well as the level and type of replication of that data volume on other storage devices.

The Tier classification of components and resources represent a layer of abstraction of the storage environment representing normalization of storage service level across different components and components types in the environment. Such normalized layer of abstraction is useful for gaining visibility into the end to end storage environment and managing and controlling in an optimal both the service levels provided to applications on one hand, and the amount of resources (and costs) required to provide that level of storage service.

Figure 2:
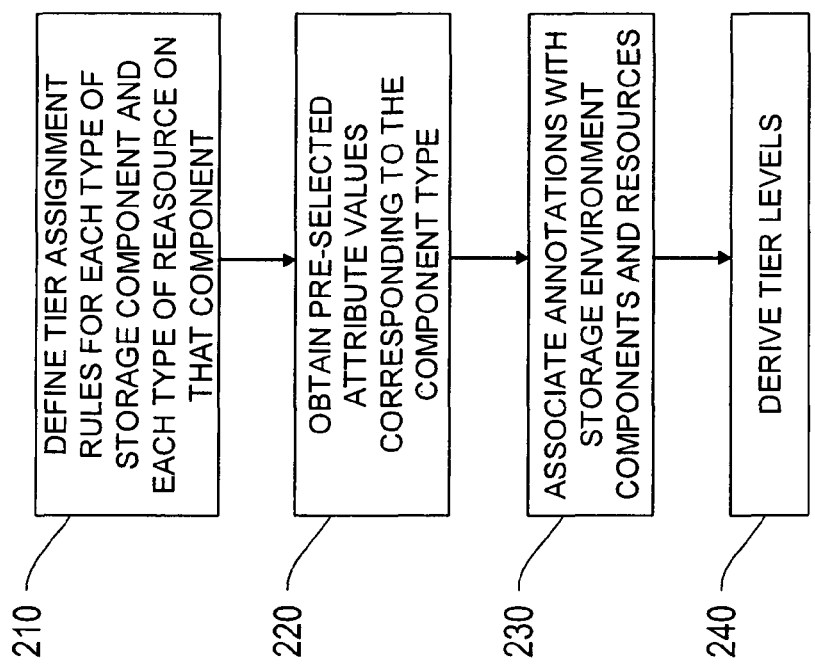
FIG. 2 shows a process flow for the tiering module of the capacity manager.

The Tiering Module within the Capacity Manager performs the process depicted in FIG. 2.

Step 210: Define generic tier assignment rules for each type of storage component and each type of resource on that component based on type and attribute value information.

For example, a rule may specify that all storage devices of type EMC DMX with a certain RAID set-up level are classified as Tier 1.

Figure 3:
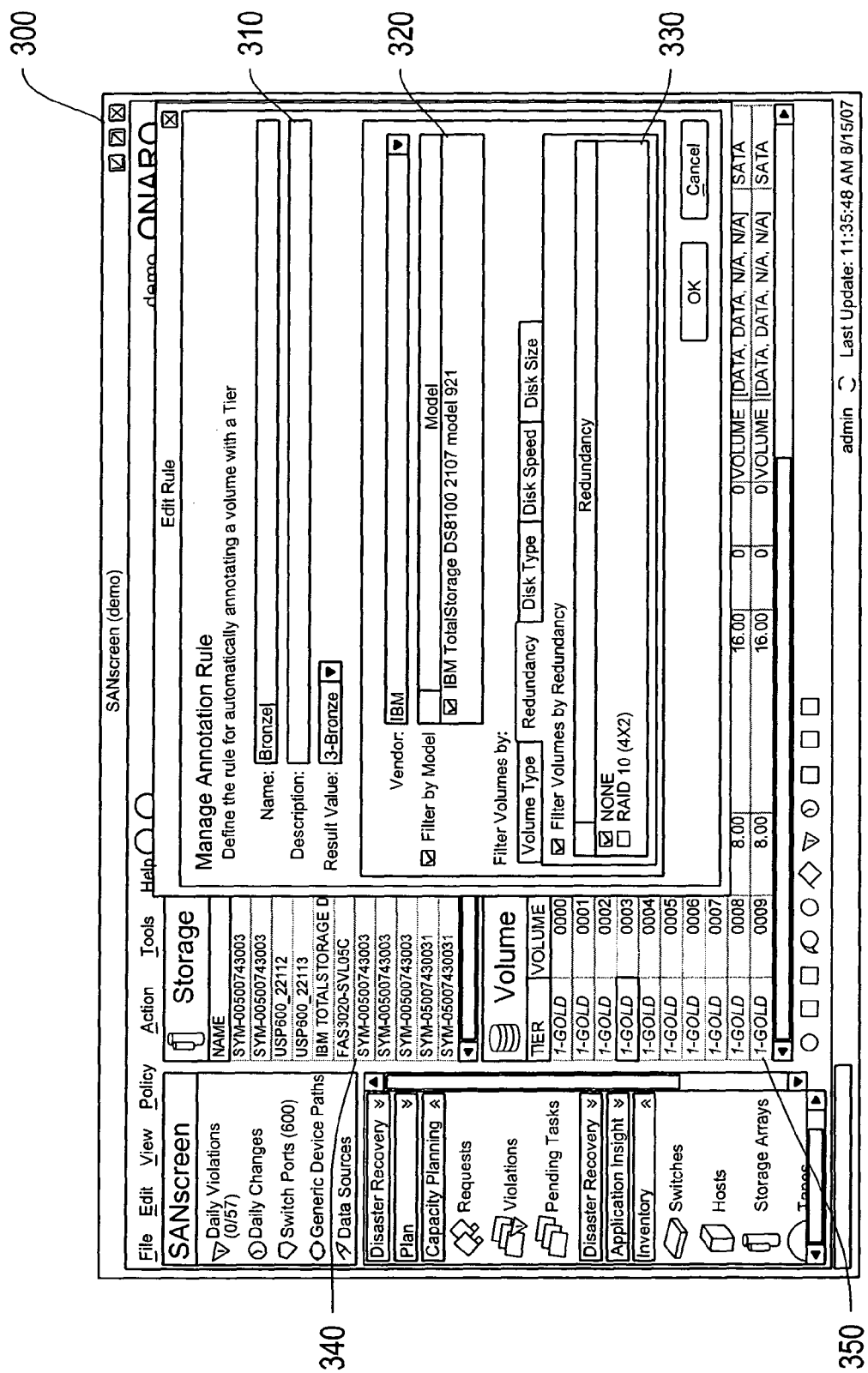
FIG. 3 shows an exemplary tier rule specification based on a screen in the capacity manager.

FIG. 3 includes an exemplary tier rule specification based on a screen (300) in a Tier Management module of a Capacity Manager. In this example volumes in storage device of type IBM Total storage DS8100 2107 Model 921 (320) which have no redundancy (330) will be classified as Tier 3—Bronze (310) whereas the volumes in storage device of type EMC Sym (340) are classified as Tier 1—Gold.

Step 220: Interact with each storage environment component and obtain selected attribute values corresponding to the component type. For example, in the exemplary environment of FIG. 1, the model of storage device 150 can be obtained as can the model and data transfer parameters of switch 122.

Step 230: Associate Annotations with storage environment components and resources. Component Annotations values are stored internally at the Capacity Manager associated with the corresponding component id, and can be updated when required. Component Annotation values are considered as additional component attribute values, and can be used for management operational process and can be used with the rules to derive Tiers of components and resources.

Figure 4:
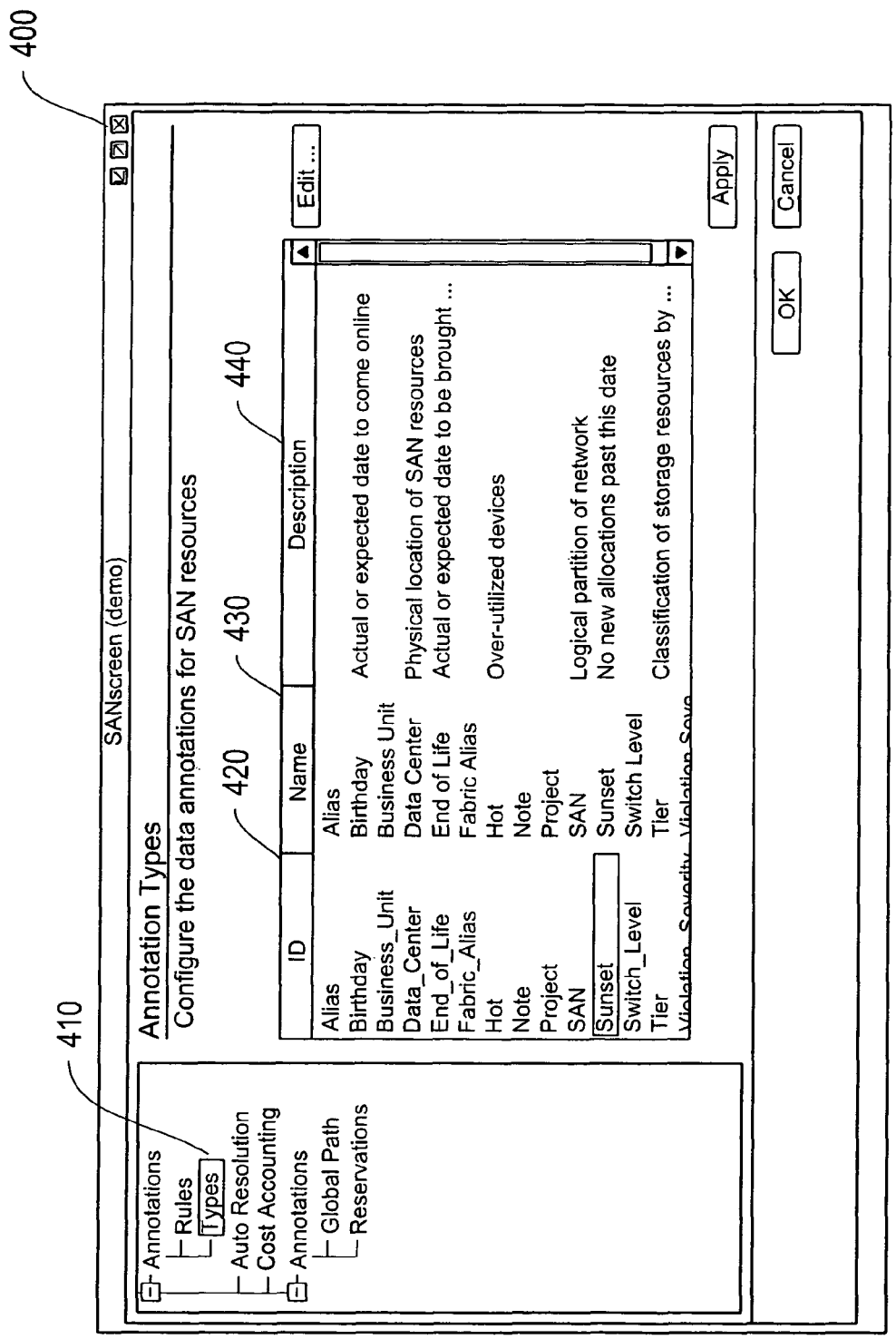
FIG. 4 includes an exemplary tier annotation specification based on a screen in a capacity manager.

FIG. 4 includes an exemplary tier annotation specification based on a screen (400) in a Capacity Manager. A variety of annotation types are specified (410) each with its id (420), Name (430), and description (440). For example, the Sunset annotation is an attribute whose value specifies the last date by which allocations can be performed at this component.

Step 240: Using Tier rules derive Tier Level of components and resources based on attribute value and annotation values. Rules precedence determines the order by which rules should applied and which results should take precedence in cases of results ambiguity.

For example in the exemplary environment of FIG. 1, Storage devices 150 and 131, and switch 122 may be derived at being Tier 1 components based on their models and set-up attributes, while storage device 134 may be derived to be a Tier 2 level component. That implies that components 150, 132, and 122 have characteristics which correspond to high levels of performance, availability normalized values, while component such as 134 have lower corresponding performance, availability values.

In preferred embodiments, the sequence of components between an application on a host and one of its data objects stored on a storage device, their types, attributes, state set up, and connectivity between them determine the level of storage service provided to that application. That level of service includes, for example, aspects of performance and availability for data flow. An access path between an application on a host and a data object on a storage device may be a sequence of components as described above which are set to enable information flow between the application flow on the host and the data object on the storage device. Attributes associated with each such end-to-end access path determine the level of storage service provided to that application.

Data objects replicas which are derived by various type of copy activities from the target data object of an access path are considered as replica extensions of that access path.

In the exemplary embodiment depicted in FIG. 1, with appropriate state configurations on storage environment components 124, 126, and 134, these components may form an access path between application 50 on host 106 and its volume 135 on data storage device 134. Volume 151 is a local replica of volume 135 and volume 161 is a remote replica of volume 151, and so both of these are replica extensions of the access path between app 50 and volume 135.

In certain embodiments, to discover all the access paths in the storage network environment, compute their end-to-end attributes, and establish that they are consistent with the set policy requirements, information needs to be obtained from the different components regarding the types, state, and connectivity. These aspects, among others, are described in commonly-assigned U.S. patent application Ser. Nos. 10/693, 632, 11/529,748, and 11/965,392, the contents of which are hereby incorporated herein in their entirety.

In certain embodiments, the information described above is correlated and analyzed by mapping to an abstract graph-model representation in which each node represent a component and links between nodes represent connectivity between components and internal or configuration state information in each component. Data flow between 2 nodes in the graph is deemed possible if and only if there exists an access path between the 2 nodes in the model representation, and the attributes of that data flow are determined by the attributes of the different nodes and links associated with that path. If an access path exists between 2 nodes in the graph, or, if it is desired that an access path exist between 2 nodes in a graph, these 2 nodes may be called end nodes.

In preferred embodiments, logical access paths may be derived or identified in this manner and an abstract graph representation of the SAN may be constructed. The connection and configuration state information from each of the devices may be used in an aggregated process to generate an abstract graph representation of the network representing the logical access paths in the SAN.

Each SAN device may be represented as a node in the graph. End-nodes represent applications/servers (source endpoints) and storage/data objects e.g. Volumes or LUNs (target end-points). In the first part of the abstract graph construction each edge between nodes represents an existing physical link between the SAN devices (or between a SAN device and a SAN end-points). In the next part of the constructions edges are eliminated in each case of a logical constraint, as defined in a device configuration, which disable flows on that link. The result of this iterative construction is an abstraction in which a logical access path between one application on a server and a data object e.g. Volume or LUN on a storage device exists if and only if a path exist in the abstract graph between the corresponding end nodes. An intermediate node is a node that is connected to two or more end nodes.

For the sake of process efficiency, the iterative step of graph edge elimination or pruning based on logical constraints implied by device configuration set-up is performed in a order designed to achieve as much pruning as early as possible. For that purpose SAN semantics are utilized to determine the order in which device constraints are considered. For example, a LUN masking constraints on one device which constraints most of the potential flows along the physical paths, may be used to prune the graph before a zoning constraint on another which restricts a smaller number of flows.

In certain embodiments, access path attributes are computed for each of the existing logical access paths according to the required attributes values specified in the logical access paths policy. The attribute values include, inter alia: level of end-to-end redundancy; type of redundancy; number of hops; and number of allocated ports.

Each storage infrastructure component of any type and tier may have resources associated with it which can be utilized by applications. The type of each resource corresponds to the type of the component in which the resource is located. The Resource Capacity of each type of resource is the total amount of resources of that type at a specific component or set of components.

Part of the internal; configuration state of each component contains information about the allocation of each resource, or set of resources, of that component for the exclusive use of one or more external entities, such as an application, a set of applications, other components, etc.

Resources of a components which are not allocated are considered available. Allocated resources at a component can be de-allocated and the internal configuration state updated accordingly, and afterwards they can be allocated again to particular applications or components.

A resource is allocated to an access path if it is allocated either to an application or to a component which is part of that access path. A resource is associated with an application if it is allocated to that application or to a component on an access path associated with that application.

State change event at the storage environment can change any part of the state of any component, or the connectivity between components. Such state change events may also include changes to the configuration state and so changes to the allocations of resources to applications, to other components, and to access paths.

Each component of any type or tier may be associated with attributes describing its cost, its power consumption, its heat generation, its physical space consumption, etc.

A capacity manager may store internally additional annotation attributes which are associated with individual components and contain additional descriptive values associated with this component.

A capacity manager also includes an internal reservation repository in which any resource at any component in the environment which is not already allocated or reserved can be marked internally at the reservation repository as reserved to a particular application, or a to a set of applications or components.

Figure 5:
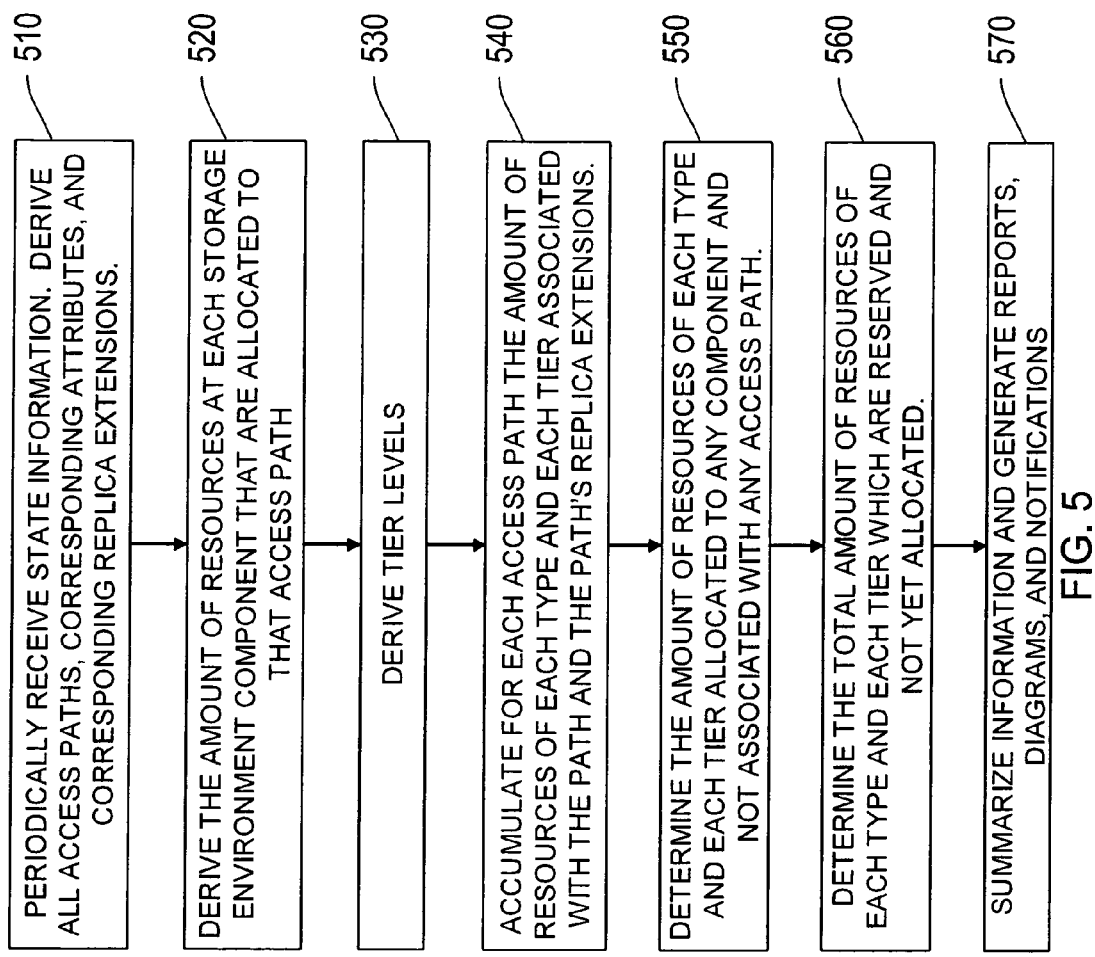
FIG. 5 shows a process performed by a Storage Management Platform (SMP) which may be part of a capacity manager.

The following process is performed by the Storage Management Platform (SMP) for the purpose of analyzing and reporting the end-to-end Capacity status of the storage environment, as depicted in FIG. 5:

Step 510: Periodically, i.e. at discrete time intervals, the SMP receives from each component in the storage environment an update message containing its state. All access paths, corresponding attributes, and corresponding replica extensions, are derived and updated internally as described above.

For example, in the exemplary environment depicted in FIG. 1 the SMP may derive the access path starting with application 50 on host 106 and comprising of components 124, 126, and 134 and volume 135, with replica extensions of volume 151 on device 150 and volume 161 on device 160.

Step 520: For each access path, and replica extensions of that access path, derive the amount of resources at each storage environment component that are allocated to that access path.

For storage device components the resources allocated to a path include storage resources (such as LUNs or volumes) of various capacities. For network switches components the resources allocated to a path include a number of ports.

For example, in the exemplary environment depicted in FIG. 1 for the access path from application 50 to volume 135, the resources allocated to that path (either exclusively or shared with one or more additional access paths) include the storage capacity consumed by volume 135 on storage component 134, the storage capacity consumed by volume 151 on storage component 150 (replica extension), the storage capacity consumed by volume 161 on storage component 160 (replica extension), as well as the number of input and output ports allocated on switches 122, 124, and 126.

Step 530: For each access path, and replica extensions of that access path, derive and the Tier level of each associated component and each resource, using the Tier assignment process described above.

For example in the exemplary environment of FIG. 1 it may be determined that storage devices 134, and 150 and storage volumes 135 and 151 are Tier 1 where as Storage device 160 and volume 161 are Tier 2.

Step 540: For each access path accumulate the total amount of resources of each type and each Tier associated with that path and the path's replica extensions.

For example in the exemplary environment of FIG. 1 the total amount of Tier 1 storage resources associated with the access path of application 50 to volume 135, are the total of the storage capacity of volumes 135 and volume 151, whereas the total amount of Tier 2 storage resources associated with that path is the storage capacity of volume 161.

Step 550: Determine the total amount of resources of each type and each Tier which are allocated at any storage environment component and are not associated with any access path of access path's replica extensions.

Such resources, which are currently unusable, may be a result of pending on-going infrastructure changes, or of errors or omissions in operational processes and so in that case may constitute potential for reclamation.

For example in the exemplary environment of FIG. 1 the total amount of Tier 1 storage resources volume 133 may be on storage device 132 may be allocated to application 50 on host 106, and appropriate LUN-making may be set on storage device 132, but no appropriate zones are set on switches 124 and 122 and so volume 133 is not on any access path and can not be accessed by application 50.

Step 560: Determine the total amount of resources of each type and each Tier which are reserved at a reservation repository of the capacity manager and which are not yet allocated in the actual storage environment components.

As described below in the specification of the change process, resources on components may be reserved to applications before actually being allocated. A reserved resource can not be allocated or reserved to another application.

For example, in the exemplary environment of FIG. 1, an additional volume with a certain capacity on storage device 132 may be reserved for application 50 but not yet allocated on device 132.

FIG. 6 presents an exemplary reservation specification based on a screen (600) in a Capacity Manager. The details of the reservation request and the resource requirements are inserted (610), and the outcome of the reservation requirement is then provided (620).

Step 570: Summarize the above computed resource amounts according to different categories and generate reports, diagrams, and notifications. Resource summary and categorization can for example be performed by applications, by groups of application or business units, by Tiers, by infrastructure domains, by Tier attributes, by Costs (using a conversion of price per resource unit at different Tiers), by power consumption, cooling requirements or space requirements (using a conversion of power or cooling requirement or space requirement by component or resource tier), by component location, by utilization levels, by allocated versus reserves, by association with access paths or not, by points in time, etc.

For example FIG. 7 presents an exemplary chargeback or cost summary report generated by the Capacity Manager (700). Three Tiers for storage resources are defined and the unit cost per GB capacity for each Tier is provided (710). The total capacity and corresponding costs, categorized by different business units is provided for the Tier 2 storage resources (720), for Tier 3 storage resources (730), for Tier 1 storage resources (740), and the total capacity of all the Tiers (750) and corresponding total cost (760).

For example FIG. 8 presents an exemplary chargeback or cost summary report with further breakdown by different days, generated by the Capacity Manager (800). For each particular date (810) the total capacity, and corresponding costs, as well as the difference in each relative to the previous date are provided for the Marketing Business Unit for Tier 2 (820), for Tier 3 (830), for Tier 1 (840), and the total of all three (850).

Figure 9:
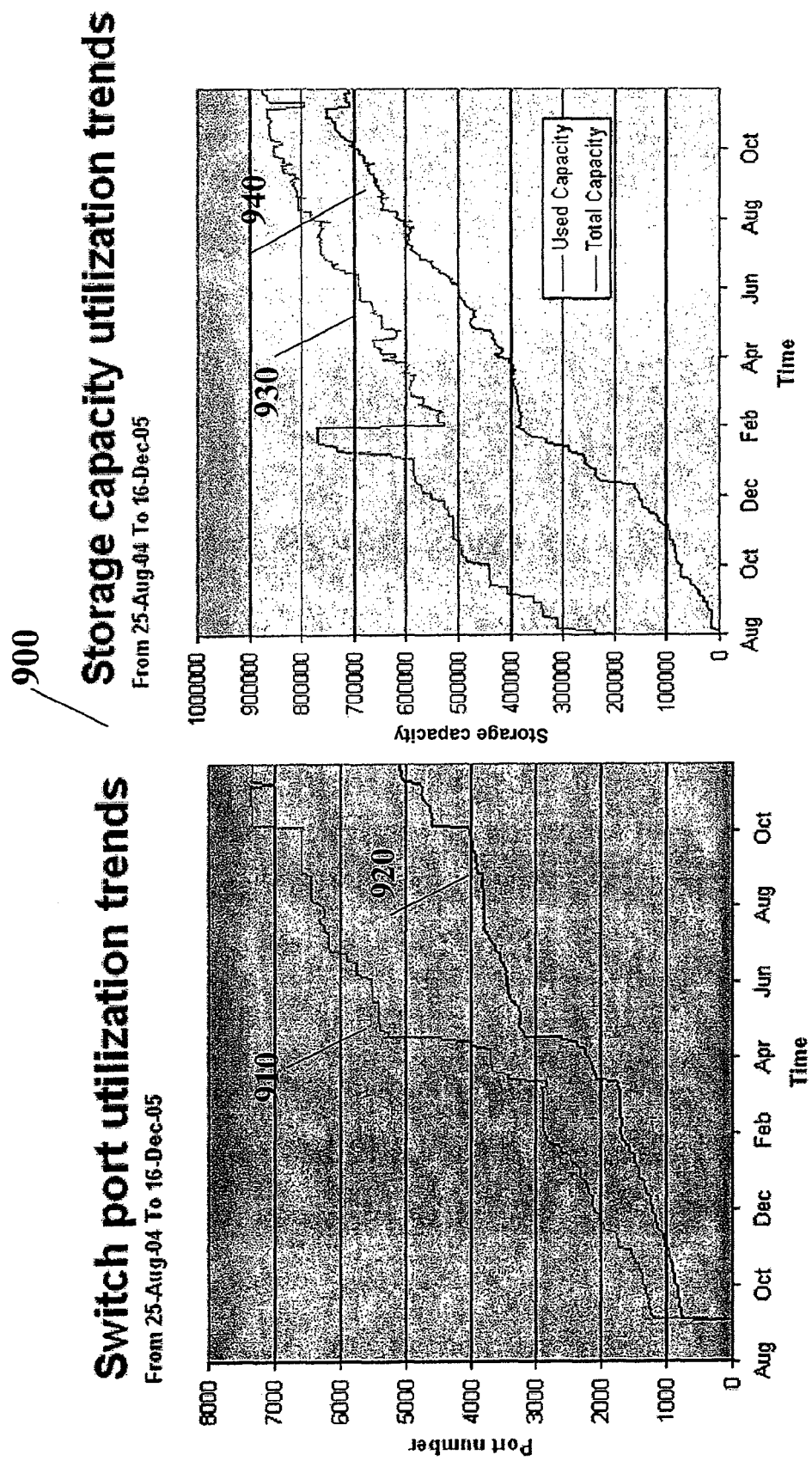
FIG. 9 shows an exemplary diagram with a plot of the resource utilization levels over a period of time.

FIG. 9 presents an exemplary diagram plotting the resource utilization levels over a period of time (900). Included are a plot summarizing the total amount of switch port resources allocated at different points in time during that interval (910), as well as a plot summarizing the total amount of switch port resources which exist in the environment at the corresponding points in time (920). Also included are a plot summarizing the total amount of storage resources which are allocated at different points in time during that interval (930), as well as a plot summarizing the total amount of storage resources which exist in the environment at the corresponding points in time (940).

In storage infrastructure environments, resource planning and consumption processes may be used to allocate or reserve resources of different types and different tiers to each access path of the network. Resources of different types and different tiers may be erroneously allocated or reserved such that the resources end up not being assigned to any particular path, and the. These orphaned resources may be produced, for example, as a result of an allocation mistake, an incomplete allocation process, or a decommissioning omission.

Furthermore, an occurrence of a network change event, such as a physical or logical change of state of one or more components on an access path, may also interfere with the execution of a planning or consumption process. A change event may be caused, for example, by a node failure, a faulty cable connection, or is initiated based on a user request. Due to their unpredictable nature, these events tend to have different effects on any number of access paths and on any level or type of resources. In certain instances, a change event is planned, in which case the subsequent effects are expected and are consistent with a predictable level of resource usage. However, in other instances, a change event is unplanned, in which case the effects are unexpected and require an almost immediate response, such as allocating additional resources on a relatively short notice.

Therefore, the dynamic nature of resource consumption in a data network makes it difficult to establish a unified resource management model across all resource planning and consumption processes, and for different resource types and tiers. Typical resource management approaches are only able to provide desirable allocation strategies for certain types of resources in an inventory. Consequently, these approaches may produce resource allocation that is too dense, thus causing over-congestion in resource utilization levels. These approaches are also likely to produce resource allocation that is too sparse, hence leading to low resource utilization representative of higher than necessary investment in network environment components.

In certain practice, dynamic storage capacity management may be able to automatically aggregate capacity information, for different resources types and tiers, from different network components at different stages of a resource management cycle for tracking resource movements in a globally consistent and application-centric manner. In certain instances, the tracked resource movements are used to estimate future resource needs in order to drive optimal component purchases and resource allocation or reservation. In certain instances, the tracked resource movements are used to determine meaningful deviations between projected status and actual status of resource association, from which adjustments may be made to better predict future capacity needs, for different types and tiers of resources.

Figure 10:
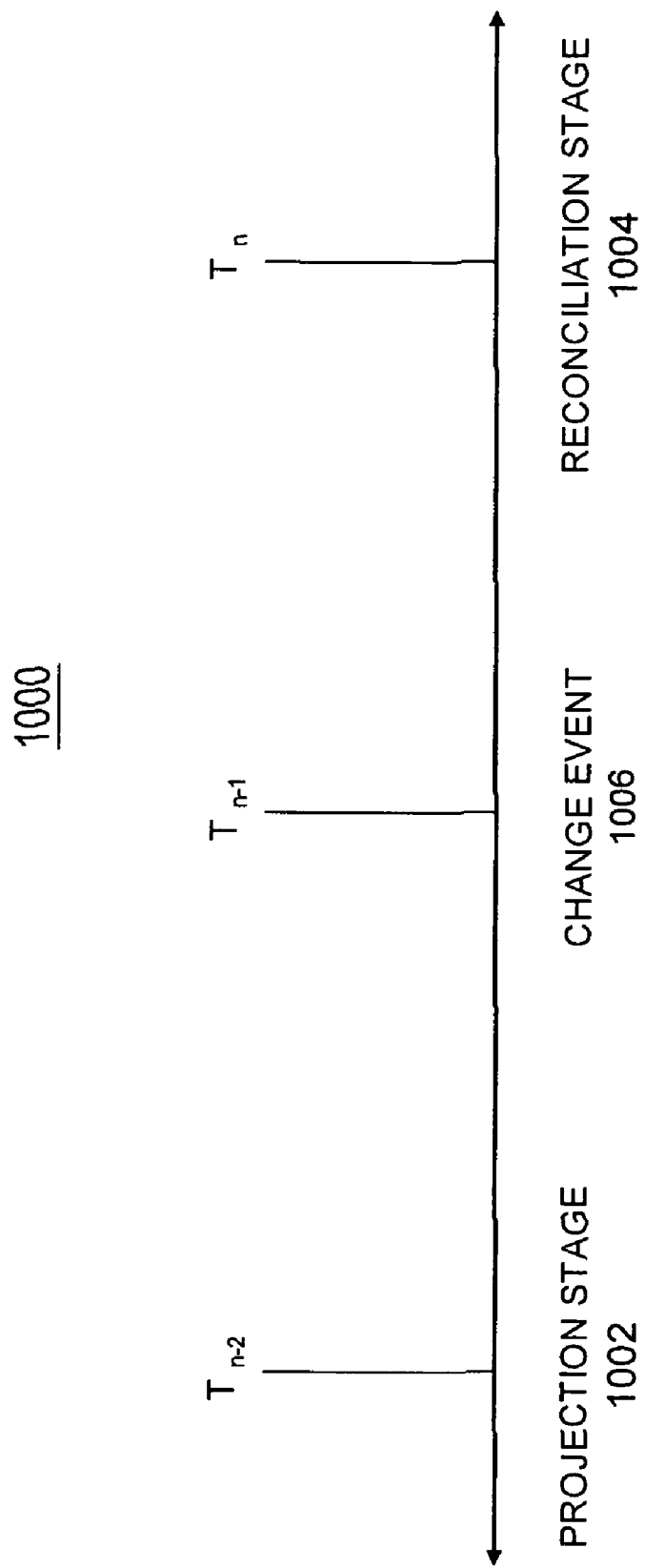
FIG. 10 depicts an exemplary capacity projection and reconciliation management process.

FIG. 10 depicts an exemplary capacity projection and reconciliation management process 1000. The process 1000 includes a projection stage 1002, occurring at time $T_{n-2}$, that provides a projection of capacity requirement for each type and tier of resource an application is expected to request for use during a future time period between $T_{n-2}$ and $T_n$. The capacity management process 1000 also includes a reconciliation stage 1002, occurring at time $T_n$, that compares actual capacity association at $T_n$ to the projected capacity requirement for $T_n$ which may be derived from the projection stage 1002 of process 1000. In one example, results of the comparison are used to adjust a projection of future capacity requirement from time $T_n$ and onward. In another example, results of the comparison are used to generate reports that provide resource allocation and utilization status summary as well as cost analysis related to each allocated or reserved resource type and tier.

In certain instances, a mismatch may occur between the actual and predicted status determined at the reconciliation stage 1004. This mismatch is caused, for example, by a change event, such as change event 1006 of FIG. 10. As described above, this change event 1006 corresponds to a planned or unplanned request for resources corresponding to an application.

Consequently, a rebalance of capacity and access path association in the data network may be required when responding to such change event. Furthermore, the projected capacity requirement generated from the projection stage 1002 may be updated at time $T_{n-1}$ to account for the occurrence of change event 1006 in order to refine the projection of resource needs for the ensuing time period.

In general, even though one occurrence of change event 1006 is illustrated in the capacity management process 1000 of FIG. 10, no change or multiple changes may occur between the projection stage 1002 and reconciliation stage 1006 of the depicted process 1000. This process 1000 may be executed on a continuous or a periodic basis so a user is able to make on-going adjustments to the projected capacity requirement based on accumulated resource information. The projection stage 1002, reconciliation stage 1004, and change event 1006 of the capacity management process 1000 will be described below in further detail.

At the projection stage 1002, the capacity management process 1000 estimates, for each application in a data network, the total resource capacity, for different types and different tiers, that the application is expected to request during the time period between $T_{n-2}$ and $T_n$. In one example, such estimation is obtained from an owner of the application based on his or her perception of future application requirements. In another example, the estimation of future resource needs is based on historical trend analysis and extrapolation of past consumption or reservation pattern of different types and tiers of resources associated with the application.

In yet another example, the estimation is based on information about component lease expiration cycles or other business cycles. The estimated resource requirements are then written to a resource policy, such as an expected resource requirement policy, corresponding to each application. Similarly, resource requirements for a network component may be written to a utilization-level policy for that component, for a group of components, for component types, or for tiers, where the utilization-level policy includes one or more utilization thresholds. In operation, a capacity allocation or reservation level above the designated thresholds may signify a need to increase inventory capacity for the pertinent component, type or tier, and an allocation or reservation level below the designated thresholds may signify low utilization of the component and possible availability of the associated resource.

Figure 11:
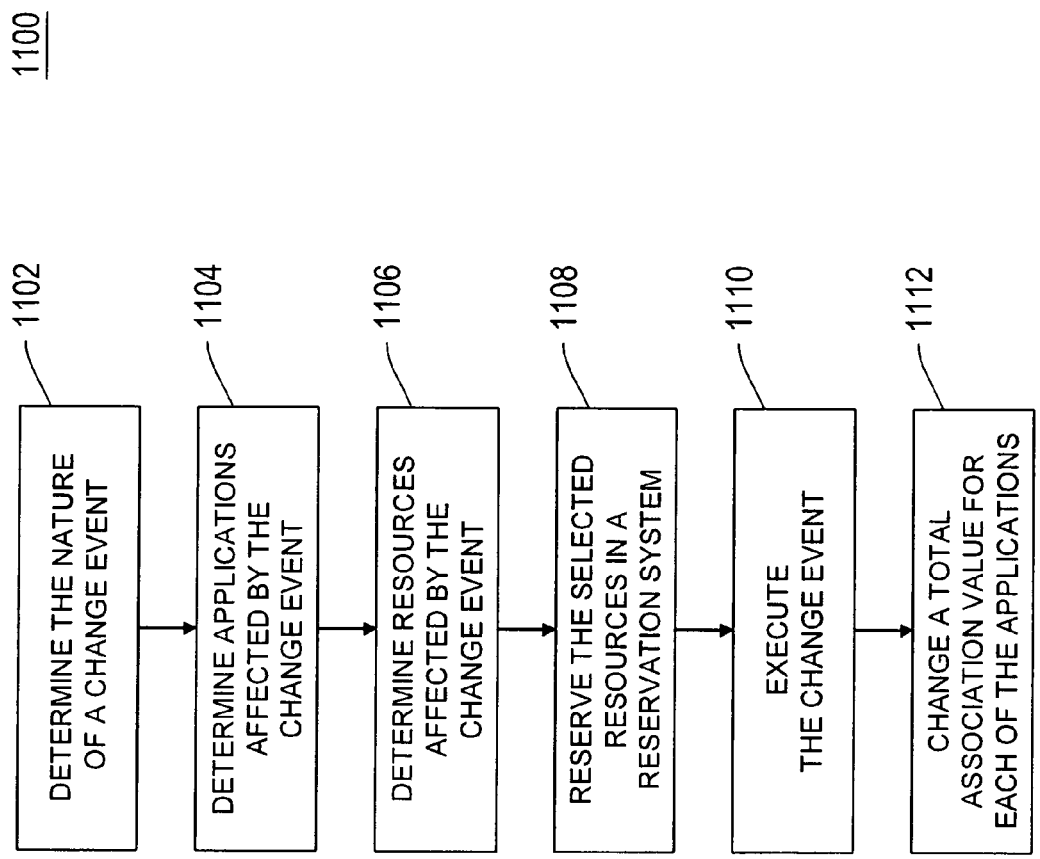
FIG. 11 illustrates an exemplary embodiment of the capacity management process of FIG. 10.

FIG. 11 illustrates an exemplary embodiment 1100 of the capacity management process 1000 of FIG. 10 in response to an occurrence of a change event, such as change event 1006 of FIG. 10. The capacity management process 1000 first determines, at step 1102, the nature of the change event 1006 in order to formulate the appropriate actions to such event. The process 1000 then determines, at steps 1104 and 1106, one or more applications and resources in a data network that may be affected by the change event. At step 1108, the process 1000 reserves the selected resources, of appropriate types and tiers, in a reservation system corresponding each of the identified applications. The reservation system may be configured to prevent double reservation of the resources by parallel change processes. Furthermore, at step 1110, process 1000 executes the allocation change event at designated components of the storage environment, as set forth by the reservation made in step 1108. Finally, at step 1112, for each type of resource that is successfully associated with an application, process 200 suitably adjusts a total association value by resource type corresponding to the application in order to track its capacity assignment status.

The generalized process outlined in FIG. 11 may be applied to various types of change events that include, for example, disconnecting a device from or connecting a device to a data network, disconnecting a link from or connecting a link to a data network, adding a new device, updating device firmware, changing device zoning, changing device LUN-masking, requesting resource allocation, and requesting resource de-allocation.

With continued reference to FIG. 11, if the change event constitutes a user request to allocate additional resources to an application identified at step 1104, process 1000 then proceeds to step 1106 at which the process uses, for example, an optimization technique to ascertain which resource on which device is most suited for allocation to the application. The optimization technique may employ a number of optimization criteria to identify the optimal resources. The process 1000 then reserves, at step 1108, the selected resources in the reservation system and allocates, at step 1110, the reserved resources to the applications at components designated by the reservation. Such change event execution also involves updating the connectivity of access paths in the storage environment. At step 1110, for each type of resource that has been successfully allocated, process 1000 increases the total association value by resource type and tier corresponding to the application.

In another example, if the change event includes a request by the user to de-allocate network resources associated with an application, process 1000 proceeds to step 1106 to identify the pertinent resources for de-allocation. Subsequently, at step 1108, the process 1000 reserves the selected resources using the reservation system and performs the necessary operations, at step 1110, to dissolve the association between the identified application and resources at components designated by the reservation. For each type of resource that has been successfully de-allocated for the application, the process 1000 subtracts, at step 1112, an appropriate amount from the association value of the corresponding application. Each event detected in the storage environment, and each state computed, are stored indefinitely with the appropriate timestamp, description, and context information to be used for any required trending, projection, trouble-shooting, or audit processes.

Figure 12:
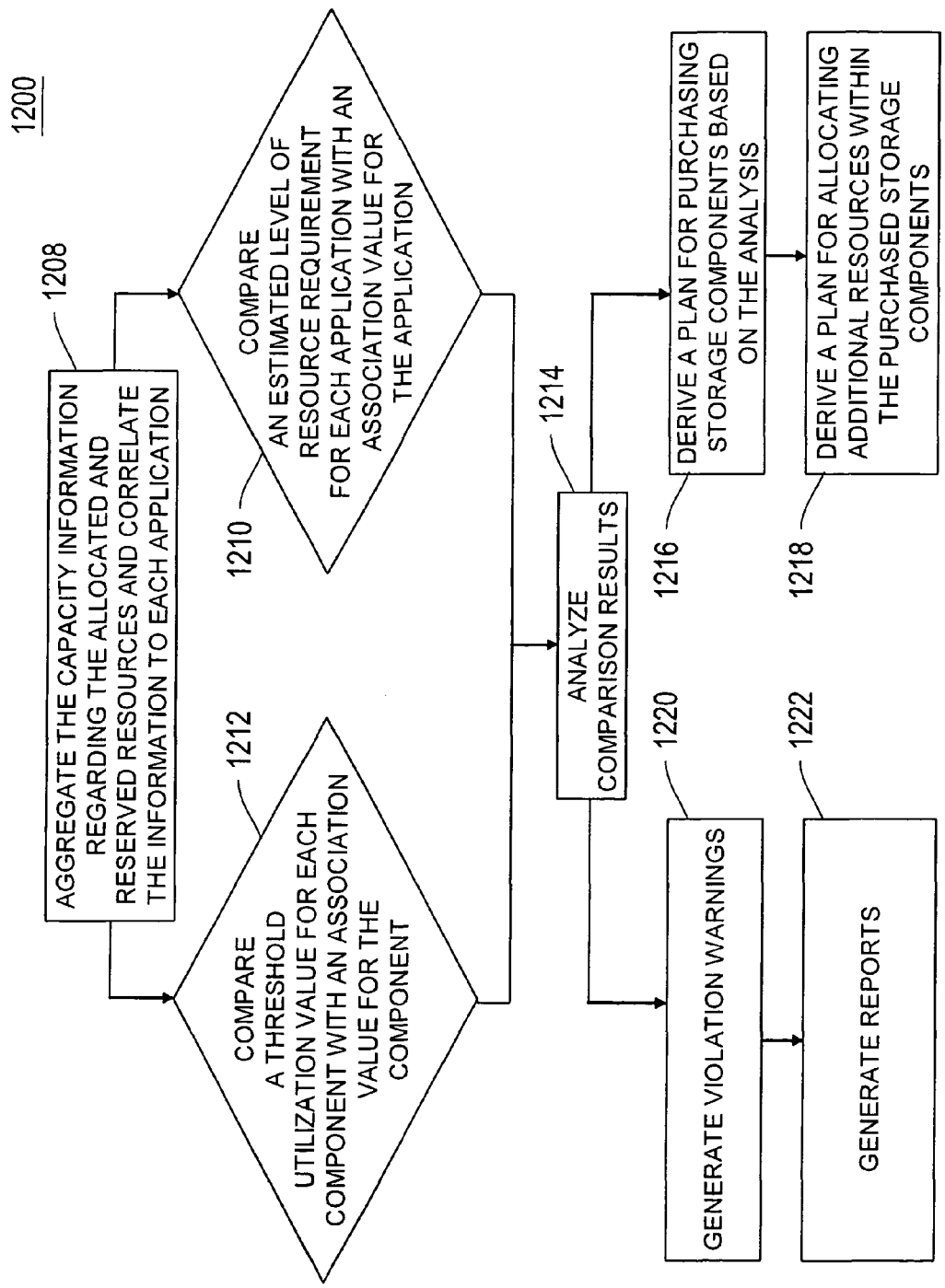
FIG. 12 illustrates an exemplary embodiment of the reconciliation stage process of FIG. 10.

FIG. 12 illustrates an exemplary embodiment 1200 of the process 1000 at the reconciliation stage 1006 of FIG. 10. The capacity manager first (1208) performs the capacity assessment process described above in FIG. 11. Process 1000 proceeds by comparing the current status generated at step 1208 of FIG. 12 with a projected status of resource association generated from the projection stage 1002 of FIG. 10. In one embodiment, the comparison is performed in an application-centric manner. For example, the association value that tracks each type and tier of allocated and reserved resource corresponding to an application may be compared, at step 1210, to the estimated level of capacity stored in an expected-resource requirement policy for that application. This comparison thus allows a user to evaluate capacity association from an application-oriented perspective. In another embodiment, the comparison between the current status and the projected status of resource association is performed in a component-centric manner. For example, the current association value for each type of resource corresponding to a network component may be compared, at step 1212, to the utilization threshold value stored in a utilization level policy corresponding to the component, or resource type or tier. This comparison thus allows the user to evaluate capacity association from a component-oriented perspective.

At step 1214, based on an analysis of the comparisons performed at steps 1210 and 1212, several actions may occur. According to one action, if the expected resource requirement is higher than, or close to, the current level of resource association, the process 1000 is adapted to increase the size of current resource inventory, such as allowing appropriate extra margins or acquiring additional devices. For example, the capacity management process 1000 is able to first formulate and optimize plans for purchasing additional storage components at step 1218 and then optimally allocate or reserve resources within the purchased components at step 1220 in response to the need for additional capacity.

The analysis performed at step 1214 may also be used to detect, at step 1220, several types of resource utilization violations. These violations include, for example, resources allocated without an assigned access path (orphaned resources) and resources allocated to a path that is not necessary for achieving service-level requirements specified for that path (e.g., resources having more redundancy or data copies than required for that path). Other detectable violations include, for example, a resource utilization level that is too low for a given resource at a give component in relation to a lower bound threshold specified by the utilization policy of that resource, a resource utilization level that is too high for a given resource at a given component in relation to an upper-bound threshold specified by the utilization policy of that resource, and a resource type having an association value that is higher than the expected resource requirement value in its expected resource requirement policy.

Furthermore, at step 1222, the capacity management process 1000 may generate resource allocation and utilization status summaries, broken down by different resource types, attributes, applications, etc. The process 1000 is also able to produce reports providing cost analysis information that associates excessive cost to over-estimation or under-estimation of resource requirements.

While the invention has been disclosed in connection with the embodiments shown and described in detail, various modifications and improvements may be made thereto without departing from the spirit and scope of the invention. By way of example, although the illustrative embodiments are depicted with reference to a storage area network (SAN), this need not be the case. Instead, other storage infrastructures with defined access paths may employ the method of the invention, and the network fabric may include any type of device that provides the described connectivity between storage environment components. Accordingly, the spirit and scope of the present invention is to be limited only by the following claims.

What is claimed is:

1. A computerized process for periodically analyzing a capacity level of component device resources associated with applications in a storage network environment, comprising:
   collecting information from the component device resources in the storage network environment;
   deriving one or more access paths in the storage network environment associated with each application of a plurality of applications, based on the collected information, wherein each access path comprises an end-to-end logical path between the associated application and a component device resource used by the associated application;
   determining a tier level for each of the component device resources in the storage network environment representative of a level of storage service supported by the resource;
   computing, for each access path associated with an application, a total amount of resources associated with the access path that have been allocated to the access path and the tier levels of the allocated resources;
   collecting information about the total amount of resources that have been reserved for each application and the tier levels of the reserved resources, wherein the reserved resources cannot be used by the application unless allocated, and cannot be allocated or reserved to another application;
   classifying the allocated and reserved resources for each application into tiers, into allocated and reserved resources on access paths associated with the application, and into allocated and reserved resources not on access paths associated with the application, whereby the allocated and reserved resources not on the access paths associated with the application are inaccessible by the application.

2. The computerized process of claim 1, wherein a reservation repository contains information about the allocated and reserved resources for each application in the storage network environment at a current time.

3. The computerized process of claim 1, wherein deriving the one or more access paths comprises mapping network component configuration and connectivity information to nodes and vertices of an abstract graph and determining whether information can flow between end nodes in the graph.

4. The computerized process of claim 1, wherein determining the tier levels for each resource comprises setting tier assignment rules, deriving a type, an attribute value, and an annotation value of the resource, and using rules to determine the tier level of the resource based on the type, the attribute value and the annotation value.

5. The computerized process of claim 1, wherein the tier level for each resource is a ranking of normalized value ranges characterizing the storage service levels, wherein the normalized value ranges include one of ordinal and numeric values.

6. The computerized process of claim 1, further comprising continuously monitoring the network environment and a reservation repository;
   detecting state change events and obtaining updated state information;
   using the updated state information to compute for each application the accumulated total amount of allocated and reserved resources allocated to the application and their tier levels; and
   using the updated state information to analyze the allocated and reserved resources allocated to or reserved for each application and determine whether the allocated and reserved resources are currently accessible by the application via an access path.

7. The computerized process of claim 1, further comprising periodically generating summary reports containing:
   current total amount of allocated and reserved resources;
   a ratio of the total amount of allocated and reserved resources to an amount of total available component device resources in the corresponding component, or to an amount of allocated and reserved resources at other components of the same type and tier; and
   a cost of the allocated or reserved resources.

8. The computerized process of claim 7, further comprising providing information in the reports on component power-consumption, component heat generation, and component physical space consumption.

9. A capacity manager for managing a capacity level of component device resources associated with applications in a storage network environment, comprising a processor for:
   collecting information from the component device resources in the storage network environment;
   deriving one or more access paths in the storage network environment associated with each application of a plurality of applications, based on the collected information, wherein each access path comprises an end-to-end logical path between the associated application and a component device resource used by the associated application;
   determining a tier level for each of the component device resources in the storage network environment representative of a level of storage service supported by the resource;
   computing, for each access path associated with an application, a total amount of resources associated with the access path that have been allocated and reserved resources to the access path and the tier levels of the allocated resources;
   collecting information about the total amount of resources that have been reserved for each application and the tier levels of the reserved resources, wherein the reserved resources cannot be used by the application unless allocated, and cannot be allocated or reserved to another application;
   classifying allocated and reserved resources for each application tiers, into allocated and reserved resources on access paths associated with the application, and into allocated and reserved resources not on access paths associated with the application, whereby the allocated and reserved resources not on the access paths associated with the application are inaccessible by the application;
   constructing a resource capacity policy repository, said policy repository containing required attributes of resources of different types and different tiers reserved or allocated for the plurality of applications;
   periodically collecting information from the component device resources in the storage network environment, a reservation repository, and the resource capacity policy repository to identify a violation, wherein the reservation repository contains information about the allocated and reserved resources for each of the applications in the storage network environment at a current time; and
   sending notification messages to designated recipients with the identified violation.

10. The capacity manager of claim 9, wherein a violation includes at least one of:
   a resource that is allocated to an application but is not accessible to that application via an access path;
   a resource that is reserved by an application but not allocated to said application within a pre-selected interval of time;
   a resource that is allocated to an application but with a type or a tier not consistent with the requirements of the resource capacity policy repository;
   a total amount of resources reserved by an application or allocated to an application not consistent with the requirements of the resource capacity policy repository; and
   a total amount of resources reserved or allocated to a set of storage environment components not consistent with the requirements of the resource capacity policy repository.

11. The capacity manager of claim 9, further comprising:
   associating a timestamp with each resource allocation event and each resource reservation event;
   associating a timestamp with each resource allocation state and updating the timestamp after a new resource allocation event;
   associating a timestamp with each resource reservation state and updating the timestamp after a new resource reservation event;
   maintaining a list of past and present resource allocation states, resource reservation states, resource allocation events, and resource reservations events; and
   using the list to provide responses to queries about resource allocation and resource reservation at a given time.

12. The capacity manager of claim 11, further comprising:
   computing projections of allocation states and reservation states and of resources of specific types and tiers, wherein the computation involves extrapolating and trending from past allocation states and past reservation states, and using external input from authorized users; and
   using the computed projections to provide responses to queries about resource allocation and resource reservation at a future time.

13. The capacity manager of claim 12, further comprising estimating for each component, type, or tier, a level of utilization.

14. The capacity manager of claim 13, wherein the level of utilization is computed by computing a ratio of an amount of allocated and reserved resources of a storage environment component, a resource type, and a resource tier, to the total amount of allocated and reserved resources corresponding to the storage environment component, the resource type, or the resource tier; and providing violation notifications if the computed ratio is higher or lower than a pre-selected threshold in the capacity policy repository.

15. The capacity manager of claim 14, further comprising:
periodically computing current allocation and reservations of different applications and different resources types and tiers;
comparing the current allocation and reservation with the computed projections;
generating a projection violation notification, updating the computed projections, and sending the notification to a designated recipient.

16. A computerized process for periodically analyzing a capacity level of component device resources associated with applications in a storage network environment, comprising:
deriving one or more access paths in the storage network environment associated with each application, wherein each access path comprises an end-to-end logical path between the application and one of the component device resources used by the application;
determining, for each derived access path, the component device resources associated with the access path that have been allocated to the access path;
determining, for each of the applications, the component device resources that have been reserved for the application, wherein the reserved resources cannot be used by the application unless allocated, and cannot be allocated or reserved to another application;
determining a tier level for each of the component device resources representative of a level of storage service supported by each of the component device resources;
classifying the allocated and reserved resources for each application into allocated and reserved resources on the access paths associated with the application, and into allocated and reserved resources not on access paths associated with the application, whereby the allocated and reserved resources not on the access paths associated with the application are inaccessible by the application; and
classifying further the allocated and reserved component device resources for each of the applications into tiers.

17. A capacity manager for managing a capacity level of component device resources associated with applications in a storage network environment, comprising a processor configured to:
derive one or more access paths in the storage network environment associated with each application, wherein each access path comprises an end-to-end logical path between the application and one of the component device resources used by the application;
determine, for each derived access path, the component device resources associated with the access path that have been allocated to the access path;
determine, for each of the applications, the component device resources that have been reserved for the application, wherein the reserved resources cannot be used by the application unless allocated, and cannot be allocated or reserved to another application;
determine a tier level for each of the component device resources representative of a level of storage service supported by each of the component device resource;
classify the allocated and reserved resources for each application into allocated and reserved resources on the access paths associated with the application, and into allocated and reserved resources not on access paths associated with the application, whereby the allocated and reserved resources not on the access paths associated with the application are inaccessible by the application; and
classify further the allocated and reserved component device resources for each of the applications into tiers.

18. A computerized process for periodically analyzing a capacity level of component device resources associated with applications in a storage network environment, comprising:
deriving one or more access paths in the storage network environment associated with each application, wherein each access path comprises an end-to-end logical path between the application and one of the component device resources used by the application;
determining, for each derived access path, the component device resources associated with the access path that have been allocated to the access path;
determining, for each of the applications, the component device resources that have been reserved for the application, wherein the reserved resources cannot be used by the application unless allocated, and cannot be allocated or reserved to another application;
classifying the allocated and reserved resources for each application into allocated and reserved resources on the access paths associated with the application, and into allocated and reserved resources not on access paths associated with the application, whereby the allocated and reserved resources not on the access paths associated with the application are inaccessible by the application;
constructing a resource capacity policy repository, said policy repository containing required attributes of resources of different types and different tiers reserved or allocated for each application;
periodically collecting information from the component device resources, a reservation repository, and the resource capacity policy repository to identify a violation, wherein the reservation repository contains information about the allocated and reserved resources for each application at a current time; and
sending notification messages to designated recipients with the identified violation.

19. A capacity manager for managing a capacity level of component device resources associated with applications in a storage network environment, comprising a processor configured to:
derive one or more access paths in the storage network environment associated with each application, wherein each access path comprises an end-to-end logical path between the application and one of the component device resources used by the application;
determine, for each derived access path, the component device resources associated with the access path that have been allocated to the access path;
determine, for each of the applications, the component device resources that have been reserved for the application, wherein the reserved resources cannot be used by the application unless allocated, and cannot be allocated or reserved to another application;
classify the allocated and reserved resources for each application into allocated and reserved resources on the access paths associated with the application, and into allocated and reserved resources not on access paths associated with the application, whereby the allocated and reserved resources not on the access paths associated with the application are inaccessible by the application;

construct a resource capacity policy repository, said policy repository containing required attributes of resources of different types and different tiers reserved or allocated for each application;

periodically collect information from the component device resources, a reservation repository, and the resource capacity policy repository to identify a violation, wherein the reservation repository contains information about the allocated and reserved resources for each application at a current time; and send notification messages to designated recipients with the identified violation.

* * * * *